United States Patent
Lee

(10) Patent No.: US 9,683,871 B2
(45) Date of Patent: Jun. 20, 2017

(54) OPTICAL ENCODER

(71) Applicant: RS Automation Co., Ltd., Pyeongtaek-si (KR)

(72) Inventor: Sang Hoon Lee, Seongnam-si (KR)

(73) Assignee: RS AUTOMATION CO., LTD., Pyeongtaek-Si (KR)

( * ) Notice: Subject to any disclaimer, the term of this patent is extended or adjusted under 35 U.S.C. 154(b) by 183 days.

(21) Appl. No.: 14/290,322

(22) Filed: May 29, 2014

(65) Prior Publication Data

US 2014/0299755 A1 Oct. 9, 2014

Related U.S. Application Data

(63) Continuation of application No. PCT/KR2012/004142, filed on May 24, 2012.

(30) Foreign Application Priority Data

May 24, 2012 (KR) .......................... 10-2012-0055420

(51) Int. Cl.
G01D 5/347 (2006.01)

(52) U.S. Cl.
CPC ....... *G01D 5/3473* (2013.01); *G01D 5/34792* (2013.01)

(58) Field of Classification Search
CPC ..... G01D 5/34746; G01D 5/3473; G01D 5/26
USPC ........... 250/231.1–231.18; 33/706, 707, 1 N, 33/1 PT; 341/13, 14; 356/616, 617
See application file for complete search history.

(56) References Cited

U.S. PATENT DOCUMENTS

| | | | | |
|---|---|---|---|---|
| 4,786,891 A | * | 11/1988 | Ueda | ...... H03M 1/287 250/231.16 |
| 2008/0315076 A1 | * | 12/2008 | Kusano | ...... G01D 5/2455 250/231.1 |

FOREIGN PATENT DOCUMENTS

| JP | 61-108914 A | 5/1986 |
|---|---|---|
| JP | 3-33614 A | 2/1991 |
| JP | 2002-250639 A | 9/2002 |
| KR | 10-2011-0015598 A | 2/2011 |

OTHER PUBLICATIONS

International Search Report mailed Feb. 27, 2013 in parent International Application No. PCT/KR2012/004142 (5 pages, in Korean, with complete English translation).

* cited by examiner

*Primary Examiner* — Renee Chavez
(74) *Attorney, Agent, or Firm* — NSIP Law

(57) ABSTRACT

Provided is an optical encoder, including: a light receiving unit; and a scale moving relatively to the light receiving unit and including a first track and a second track each having patterns intended for projecting light onto the light receiving unit, wherein the number of patterns of the first track is Ns*Nd+i (where, Ns and i are an integer of 1 or greater, and Nd is an integer of 2 or greater), and the number of patterns of the second track is (Ns−1)*Nd+i, so an absolute angle of the scale can be calculated in real time and in high resolution.

10 Claims, 8 Drawing Sheets

(a)

(b)

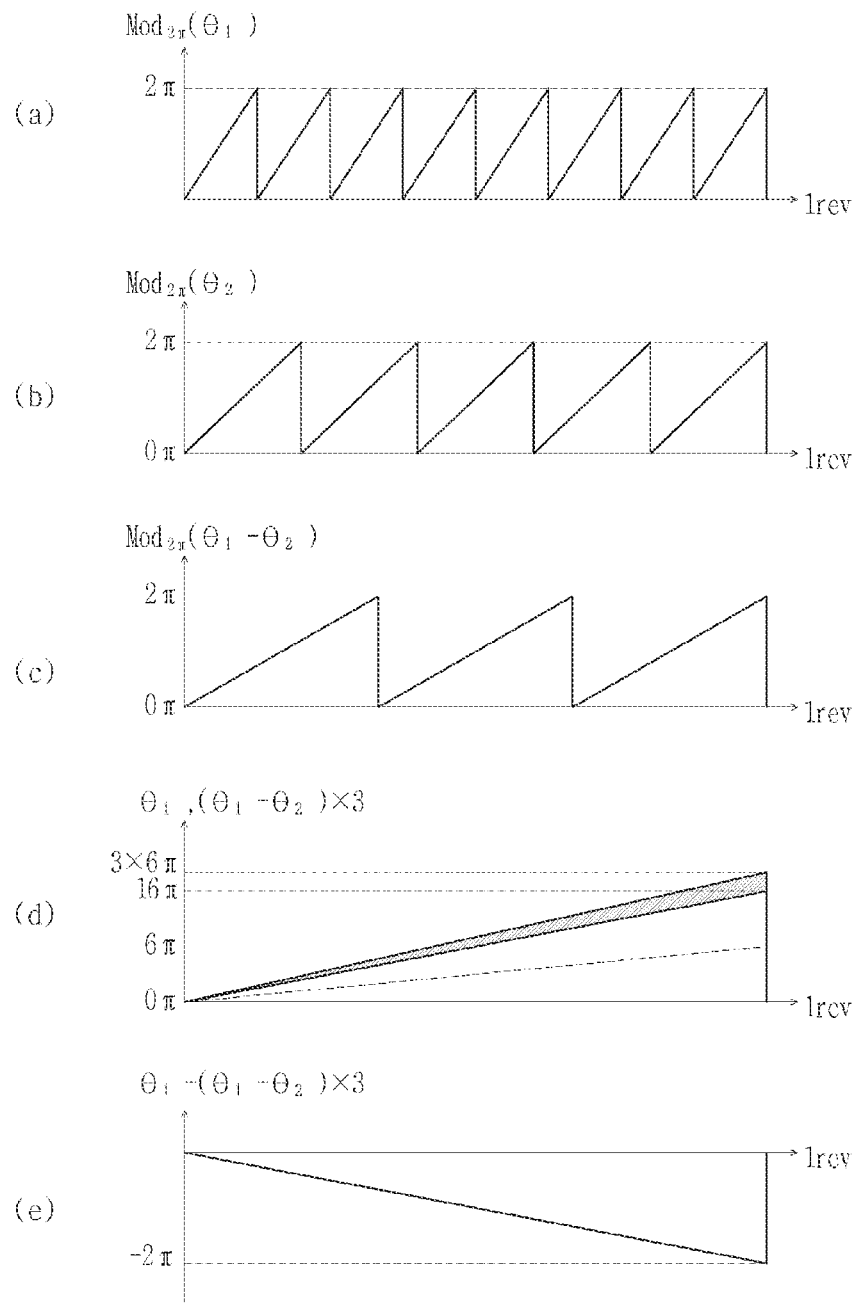

OPTICAL ENCODER

CROSS-REFERENCE TO RELATED APPLICATION(S)

This application is a continuation of International Application No. PCT/KR2012/004142 filed on May 24, 2012, which claims the benefit of Korean Patent Application No. 10-2012-0055420, filed on May 24, 2012, the entire disclosures of which are incorporated herein by reference for all purposes.

TECHNICAL FIELD

The present invention relates, in general, to an optical encoder and, more particularly, to an optical encoder capable of checking an absolute angle of a scale with respect to a light receiving unit in real time and in high resolution.

BACKGROUND ART

An optical encoder is widely used in various environments to determine the movement or position of an object with respect to an arbitrary criterion.

An optical sensor and an encoder pattern are used in a general optical encoder. The optical sensor is focused on a surface of the encoder pattern. When the optical sensor moves on the basis of the encoder pattern or the encoder pattern moves on the basis of the optical sensor, the optical sensor passes through the encoder pattern or deciphers an optical pattern reflected from the encoder pattern, thereby detecting the movement or position.

Recently, demand for an accurate encoder having high resolution has been increasing in industrial fields where extremely sensitive operations are required, like in the robotics industry.

Korean Patent Laid-Open Publication No. 2007-0026137 provides an optical encoder capable of detecting an index channel even without an element for detecting an index which becomes a standard upon determining a position. However, Korean Patent Laid-Open Publication No. 2007-0026137 does not disclose a way to measure a rotational angle using high resolution.

DISCLOSURE

Technical Problem

Accordingly, an object of the present invention is to provide an optical encoder capable of checking an absolute angle of a scale with respect to a light receiving unit in real time and in high resolution.

The technical problems to be solved by the present invention are not limited to the technical problems mentioned above, and other technical problems which are not mentioned may be understood by those having ordinary skill in the art to which the present invention pertains based on the description below.

Technical Solution

The present invention provides an optical encoder including: a light receiving unit; and a scale moving relatively to the light receiving unit and having a plurality tracks, wherein the respective tracks may include patterns intended for projecting light onto the light receiving unit, the tracks may include a first track and a second track, and a difference between the number of patterns of the first track and the number of patterns of the second track may be one.

Also, the present invention provides an optical encoder, including: a light receiving unit; a scale provided with a first track having m patterns and a second track having s patterns, wherein a difference in the number between the m and s is Nd (where, 1<Nd<m); and an arithmetic unit configured to generate a first intermediate signal by performing an arithmetic operation for a first track signal composed of m periodic signals and a second track signal composed of s periodic signals outputted from the light receiving unit by the first track and the second track, and to calculate an absolute angle based on the first intermediate signal.

Also, the present invention provides an optical encoder, including: a light receiving unit; a scale moving relatively to the light receiving unit and provided with a first track and a second track each composed of patterns intended for projecting light onto the light receiving unit; and an arithmetic unit configured to generate one periodic signal per one rotation of the scale by performing an arithmetic operation for a first track signal outputted from the light receiving unit by the first track and a second track signal outputted from the light receiving unit by the second track, and to calculate an absolute angle of the scale on the basis of the periodic signal.

Also, the present invention provides an optical encoder, including: a light receiving unit; a scale moving relatively to the light receiving unit and provided with a first track and a second track each having patterns intended for projecting light onto the light receiving unit; an arithmetic unit configured to calculate an absolute angle of the scale in a vernier method on the basis of a difference between the number of the patterns of the first track and the number of the patterns of the second track; and a converter configured to A/D convert inputted signals into discrete values, wherein the largest resolution of the absolute angle calculated by the arithmetic unit may be larger than that of the converter.

Also, the present invention provides an optical encoder, including: a light receiving unit; and a scale moving relatively to the light receiving unit and provided with a first track and a second track each having patterns intended for projecting light onto the light receiving unit, wherein the number of the patterns of the first track may be Ns*Nd+i (where, Ns and i are an integer of 1 or greater, and Nd is an integer of 2 or greater), and the number of the patterns of the second track may be (Ns−1)*Nd+i.

Advantageous Effects

According to the present invention, an optical encoder can check an absolute angle of a scale with respect to a light receiving unit in real time and in high resolution by using a difference in the number of patterns constituting a plurality of tracks provided in the scale, and an arithmetic operation.

Moreover, the performance can be achieved by a simple configuration.

DESCRIPTION OF DRAWINGS

FIG. 8 is a schematic diagram showing signals generated from an optical encoder according to a further embodiment of the present invention.

MODE FOR INVENTION

Figure 1:
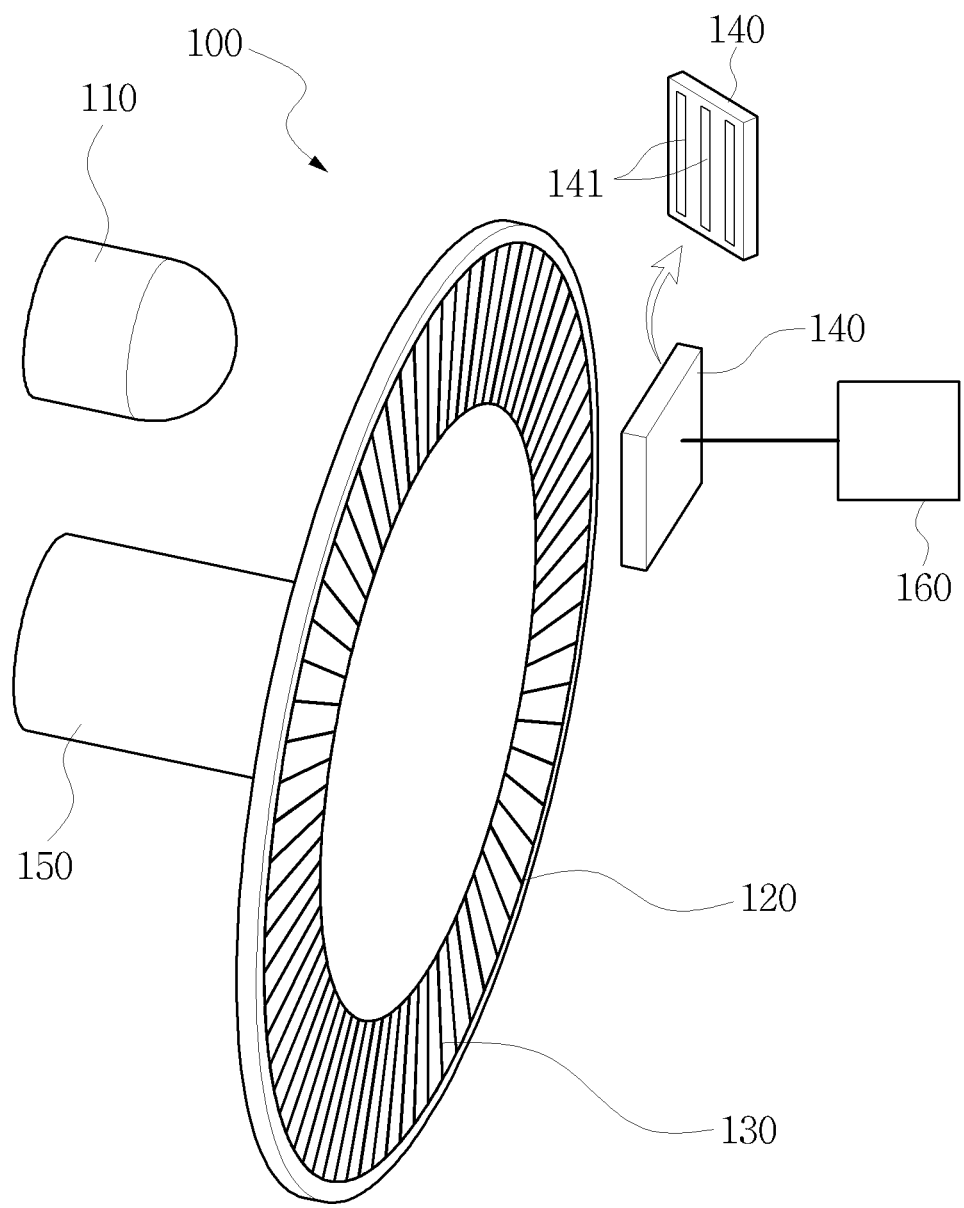
FIG. 1 is a schematic diagram showing an optical encoder.

Hereinbelow, embodiments of the present invention will be described in detail with reference to the accompanying drawings. It should be understood that the shape and size of the elements shown in the drawings may be exaggeratedly drawn to provide an easily understood description of the structure of the present invention. Terms specially defined in consideration of the elements and operations of the present invention may be changed according to a user or operator's intention or practice. The definitions of these terms should be interpreted within the context throughout the specification.

FIG. 1 is a schematic diagram showing an optical encoder.

An optical encoder 100 illustrated in FIG. 1 includes: a light source 110; a scale 120; a light receiving unit 140; and an arithmetic unit 160 connected to the light receiving unit 140.

For example, an LED (light emitting diode), an LD (laser diode) or the like can be used as the light source 110.

The scale 120 may be disposed between the light source 110 and the light receiving unit 140 and may be attached to a rotation axis 150 which is a target of measurement. Since the scale 120 and the light receiving unit 140 move relative to each other, the light receiving unit 140 instead of the scale 120 may be attached to the rotational axis 150. In the scale 120, second patterns 130 for modulating a light beam are provided along a circumference. The second patterns 130 are patterned to correspond to a rotational angle of the rotational axis 150. In FIG. 1, the scale 120 is represented as a disk type scale appropriate for the rotational axis 150, but the scale may be a plate type scale applicable to a linear encoder.

The light receiving unit 140 receives a light beam from the second patterns 130 and converts it to electrical signals, thereby outputting the electrical signals to the arithmetic unit 160. Specifically, the light receiving unit 140 includes at least one light receiving element formed of first patterns 141. At this time, when a light beam is received, the respective light receiving elements generate electrical signals, thereby outputting the electrical signals to the arithmetic unit 160.

The arithmetic unit 160 calculates a rotational angle or a rotational position of the scale 120, namely, the rotational axis 150, thereby outputting the rotational angle or position.

As an example, FIG. 1 shows a case in which the optical encoder 100 is a rotary encoder, but the optical encoder is not limited thereto, and is also applicable to a linear encoder and the like. Also, in FIG. 1, even though it is exemplified that the light receiving unit 140 detects a light beam of the light source 110 which penetrates the patterns 130, without being limited thereto, the light receiving unit may be configured to detect reflection light.

Figure 2:
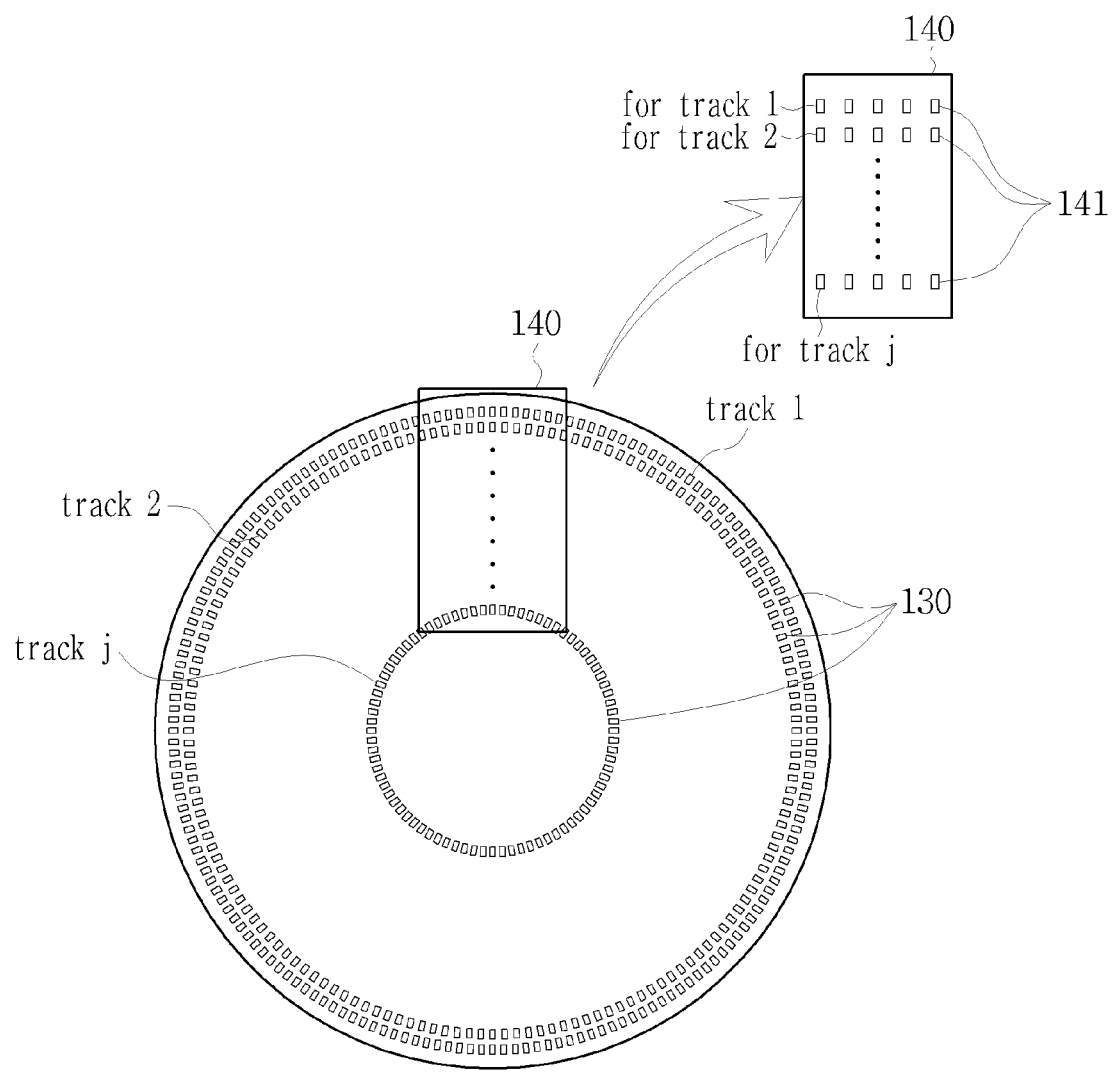
FIG. 2 is a schematic diagram showing an optical encoder of the present invention.

FIG. 2 is a schematic diagram showing the optical encoder of the present invention.

The optical encoder illustrated in FIG. 2 includes a light receiving unit and a scale moving relatively to the light receiving unit and having a plurality of tracks. At this time, the respective tracks include patterns intended for projecting light onto the light receiving unit.

As reviewed above, the light receiving unit receives a light beam from the patterns formed in the scale, namely, the second patterns and converts it to electrical signals, thereby outputting the electrical signals to the arithmetic unit. Since the scale includes the plurality of tracks, the light receiving unit may include the first patterns corresponding to the respective tracks.

According to a first embodiment, the scale may include a first track and a second track wherein a difference in the number of patterns therebetween is one.

As illustrated in FIG. 2, when j tracks (where, j is an integer of 2 or greater) are formed in the scale, the first track and the second track may be selected from the j tracks. Of course, only the first track and the second track may be formed in the scale.

At this time, the arithmetic unit may calculate a rotational angle of the scale with respect to the light receiving unit using signals outputted from the light receiving unit by the first track and the second track. The calculation of the rotational angle using the plurality of tracks instead of the calculation of the rotational angle using a single track is intended to practically accomplish high resolution.

An intuitive way to obtain a rotational angle in high resolution may be realized by increasing the number of patterns included in a single track after forming a reference point in the track. For example, when the reference point is formed at a point of 0°, a rotational angle of the scale with respect to the light receiving unit, namely, an absolute angle may be calculated by confirming if a signal is outputted from any single track of the $n^{th}$ time from 0°. Specifically, the absolute angle is an angle of a constant point of the scale with respect to the center of the rotational axis for rotating the scale. In a case where the reference point is used, when the number of patterns included in the track is 1024, the absolute angle may be obtained in a resolution of $2^{10}$, namely, a 10 bit resolution. This resolution is involved in the matter as to how many patterns can be created by 360°. Accordingly, a 10 bit resolution represents a subdivision of 360° into $2^{10}$ patterns.

However, as the size of the encoder becomes smaller, the scale cannot be unlimitedly larger and the patterns formed in the scale cannot be unlimitedly smaller, and accordingly, the number of patterns which can be formed in the scale is limited. Due to this reason, it is difficult to form $2^{20}$ patterns in the scale in a case where a 20 bit resolution is targeted. When the arithmetic unit performs processing of various kinds of data with digital data, an A/D (analog-to-digital) converter for converting analog signals outputted from the light receiving unit to digital signals is needed. Although a signal of the 20 bit resolution is entered from the light receiving unit, when a resolution of the A/D converter is 10 bits, the arithmetic unit obtains data having a 10 bit resolution. Accordingly, according to the resolution of the A/D converter, it may be limited to form various patterns in respect of one track.

With regard to a way to obtain an absolute angle of high resolution through patterns limited in number as above, a plurality of signals outputted from the light receiving unit to correspond to respective tracks after forming the plurality of tracks in the scale may be used. Also, according to the former way, it is not easy to obtain an absolute angle in real time at the initiatory stage of driving because the position of a reference point should be confirmed. However, when the signals outputted from the plurality of tracks are used, the absolute angle can be obtained in real time regardless of a driving stage.

A signal outputted from the light receiving unit facing the first track is referred to as a first track signal, and a signal outputted from the light receiving unit facing the second track is referred to as a second track signal. For example, when the first track is track 1 of FIG. 2 and the second track is track 2 of FIG. 2, the first track signal is a signal outputted from at least one first pattern constituting 'for track 1' in the light receiving unit. The second track signal is a signal outputted from at least one first pattern constituting 'for track 2' in the light receiving unit.

The optical encoder according to the first embodiment may include an arithmetic unit. At this time, the arithmetic unit may generate a first operation signal composed of one periodic signal per one rotation of the scale by performing arithmetic operations for the first track signal and the second track signal. The arithmetic unit may calculate an absolute angle based on the generated first operation signal. In other words, the arithmetic unit may calculate the absolute angle directly from the first operation signal or may calculate the absolute angle by applying the first operation signal to an arithmetic operation with other signals.

A way to calculate the absolute angle directly from the first operation signal may be as follows. It is assumed that the number of patterns of the first track has one more number than the number of patterns of the second track. Also, it is assumed that a shape of the second patterns included in the respective tracks and a shape of the first patterns included in the light receiving unit are formed so that a sine wave can be outputted from the light receiving unit.

Figure 3:
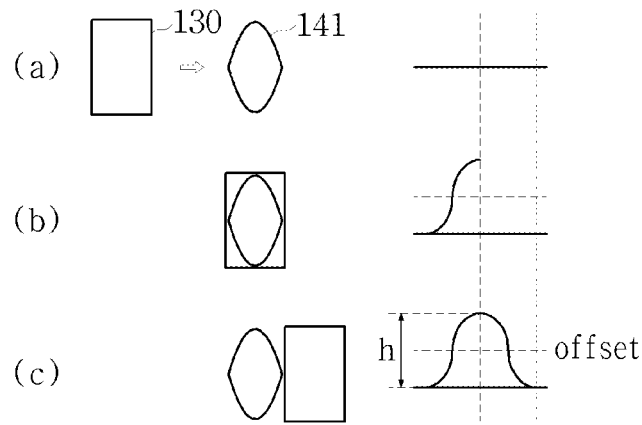
FIG. 3 is a schematic diagram showing signals generated from an optical encoder according to one embodiment of the present invention.
Figure 3:
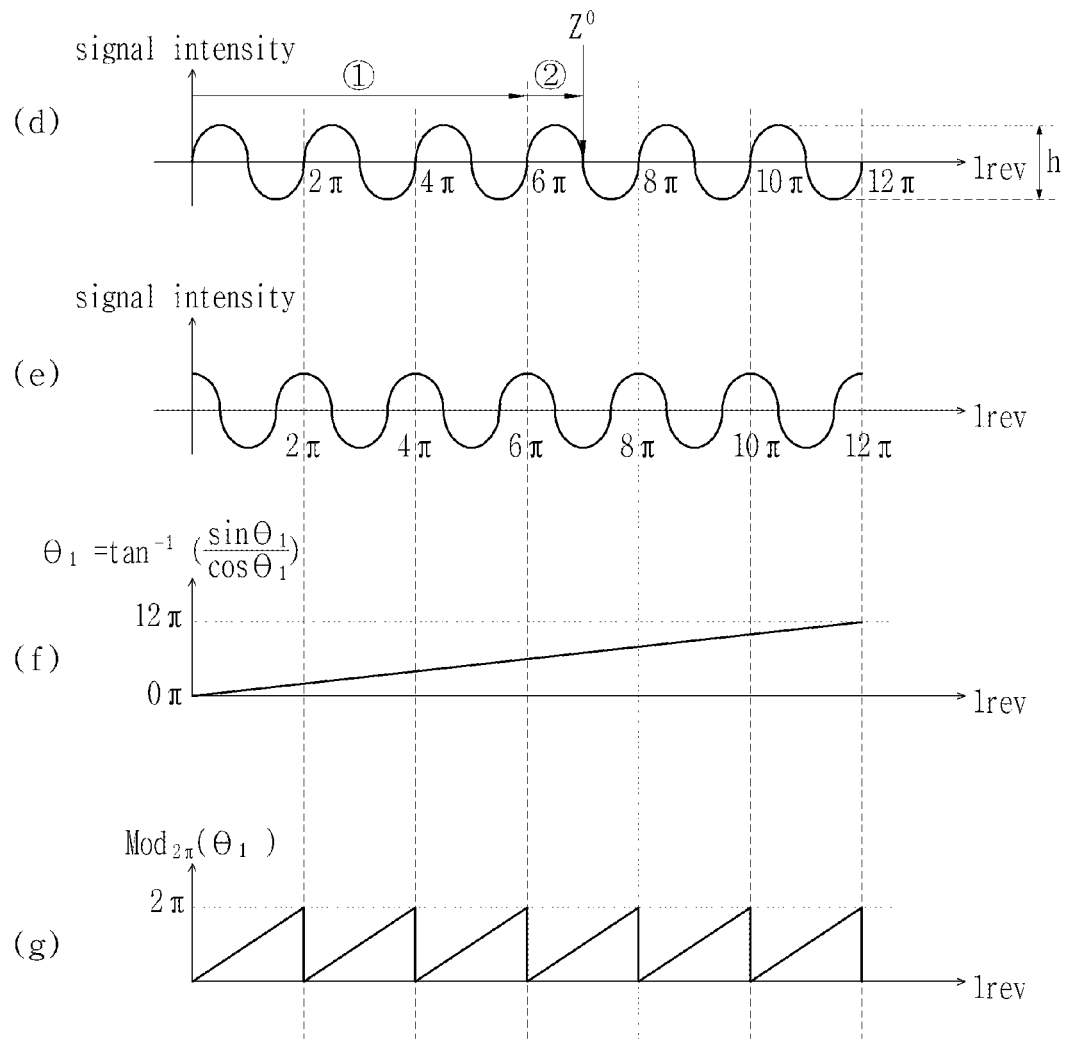

For example, when the number of patterns of the first track is six, the first track signal outputted from the light receiving unit and a processing signal thereof are shown in FIG. 3.

FIG. 3 is a schematic diagram showing signals generated from an optical encoder according to one embodiment of the present invention.

An electrical signal outputted from the first pattern is related to an area of the first patterns onto which light is projected. In a case where the projected light is uniform in intensity, a strong signal is outputted when the light is projected onto a large area of the first patterns, and a weak signal is outputted when the light is projected onto a small area of the first patterns. For example, when the first pattern has a sine wave-like shape and the second pattern has a rectangular shape, a first track signal outputted from one first pattern is a sine wave having a $2\pi$ period as shown in (a) to (c) of FIG. 3. At this time, $2\pi$ represents the period of a signal outputted from the first pattern due to a one second pattern rather than $2\pi$ which means one rotation of the scale.

By adjusting offsets and at least one of the number and distance of the first patterns, and distance of the second patterns constituting the light receiving unit, the arithmetic unit may obtain a sine wave (d) and a cosine wave (e) each having an amplitude h as the first track signal. At this time, each of the sine wave (d) and the cosine wave (e) includes 6 signals of the $2\pi$ period, the number of which is identical to the number of the second patterns with respect to one rotation of the scale. Accordingly, as shown in (f) of FIG. 3, an angle of one rotation of the scale may be represented as a total of $12\pi$ in which the signal of the $2\pi$ period is repeated six times.

When performing an arctangent operation to which the sine wave (d) and the cosine wave (e) of one period are applied, and showing the result as a graph, the graph as shown in one section (g) of FIG. 3 is derived. Since the sine wave (d) and the cosine wave ∈ are periodically repeated six times, this results in the entire graph shown in (g) of FIG. 3. The (g) of FIG. 3 results from operation processing of $Mod_{2\pi}(\theta_1)$ with respect to (f) of FIG. 3. At this time, $Mod_{2\pi}(\theta_1)$ represents a remainder obtained by dividing the rotational angle $\theta_1$ of the scale represented as $12\pi$ in the above section by $2\pi$.

When the sine wave (d) and the cosine wave (e) are used, the angles of respective sections may be calculated. For example, it is assumed that an absolute angle of the scale is a z°. In order to calculate the absolute angle, z° using the sine wave (d) and the cosine wave (e) of FIG. 3, a currently obtained signal should be checked to be ① a fourth signal of the $2\pi$ period among six signals of the $2\pi$ period, namely, $6\pi$ to $8\pi$ sections, and it should be found if the scale is positioned ② in any position within the $6\pi$ to $8\pi$ sections. The latter position may be obtained through, for example, a result an arctangent operation obtained by performing the arctangent operation using the sine wave (d) and the cosine wave (e), and a proportional expression for the range of real angles possessed by the respective sections on the scale.

The z° of FIG. 3 results from adding ① and ②, together. However, in the signals of the $2\pi$ period, since the same waveforms are repeated per the $2\pi$ period, in order to obtain ①, like (f) of FIG. 3, $0\pi$, namely, a reference point should be found. In order to find the reference point, a process, such as rotating the scale once in advance is needed, and accordingly, it is difficult to obtain an absolute angle in real time.

There is a need to exclude the reference point in order to obtain the absolute angle in real time. To do so, the first track signal and the second track signal may be used together.

In accordance with the assumptions above, when the number of patterns of the first track is m, the number of patterns of the second track is m−1. Since the number of patterns of the first track in FIG. 3 is six, the number of patterns of the second track is five. Accordingly, in the arithmetic unit, a sine wave including, as the second track signal, five signals of the $2\pi$ period per one rotation of the scale is obtained. Like (f) of FIG. 3, based on the obtained sine wave, an angle of one rotation of the scale may be represented as $10\pi$ in which the $2\pi$ periodic signal is repeated five times.

Figure 4:
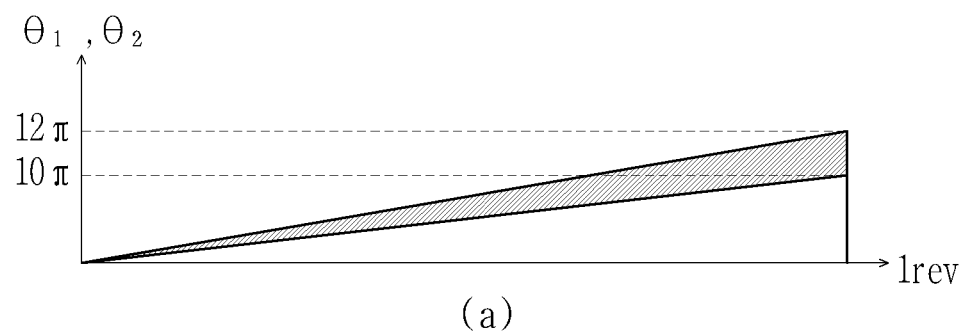
FIG. 4 is a schematic diagram showing a method of calculating an absolute angle based on a first track signal and a second track signal.
Figure 4:
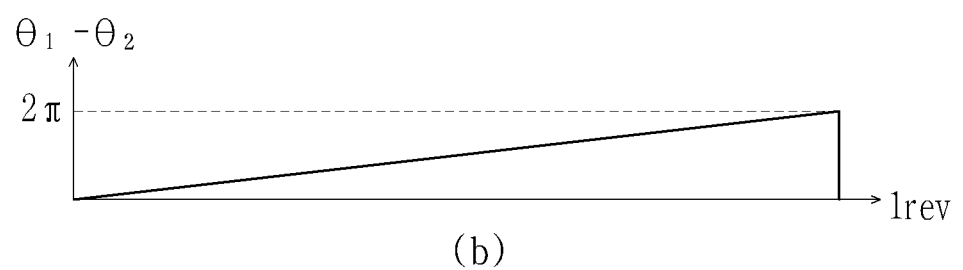

FIG. 4 is a schematic diagram showing a method of calculating an absolute angle based on the first track signal and the second track signal.

(a) of FIG. 4 illustrates both the first track signal representing one rotation of the scale as $12\pi$ in which the $2\pi$ periodic signal is repeated six times, and the second track signal representing one rotation of the scale as $10\pi$ in which the $2\pi$ periodic signal is repeated five times. Reviewing (a) of FIG. 4, it can be seen that with regard to a difference value of the first track signal and the second track signal, all values on a vertical axis are different from each other.

The difference value of the first track signal and the second track signal may be represented as one periodic signal per one each rotation of the scale as shown in (b) of FIG. 4, and at this time, the periodic signal may be the first operation signal previously mentioned.

Reviewing (b) of FIG. 4, it can be seen that all values on the vertical axis in the section of one rotation of the scale are different from each other within the range of $2\pi$. Accordingly, the absolute angle of the scale may be calculated based on the result of subtraction of an angle $\theta_1$ calculated from the first track signal currently outputted from the light receiving unit and an angle $\theta_2$ calculated from the second track signal.

Of course, to do so, distances and widths of the second patterns constituting the first track should be identical within the first track. Similarly, distances and widths of the second patterns constituting the second track should be also identical within the second track. This characteristic is equally applied to the third track which will be later. Furthermore, when a difference between the number of patterns of the first track and the number of patterns of the second track is one, the result of adding the angle $\theta_1$ calculated from the first track signal and the angle $\theta_2$ calculated from the second track signal is definite regardless of a reference position. Accordingly, by using the result of adding $\theta_1$ and $\theta_2$, the absolute angle may be calculated in real time.

According to (b) of FIG. 4, a theoretically infinite resolution may be provided. However, the resolution of an absolute angle outputted from the optical encoder by the resolution of an A/D converter for converting an analog graph into a digital graph as shown in (b) of FIG. 4 is limited in practice. For example, when an A/D converter having a 10 bit resolution is used, the absolute angle may be practically analyzed as $2^{10}$ sections.

In order to increase the resolution of the absolute angle, the absolute angle may be calculated by applying the first operation signal to an arithmetic operation with other signals. At this time, in order to obtain the first operation signal and the other signals, the third track may be additionally formed in the scale.

The third track may have the number of patterns having the difference of an n number (where, 1<n<m, n represents an integer, and m represents the number of patterns of the first track) with the number of patterns of the first track. Also, as illustrated in FIG. 2, the third track may be one track selected from excluding the first track and the second track among j tracks in the scale.

When a signal outputted from the light receiving unit facing the third track is a third track signal, the arithmetic unit may generate the second operation signal composed of n periodic signals per one rotation of the scale by performing arithmetic operations for the first track signal and the third track signal.

At this time, the arithmetic unit may calculate the absolute angle on the basis of at least one the first operation signal, the second operation signal and the first track signal.

The first track signal and the third track signal are different from each other with respect to the number of $2\pi$ periodic signals included in one rotation of the scale due to a difference in the number of patterns constituting the respect tracks. For example, when one track includes six second patterns and three tracks include three second patterns, the first track signal for one rotation of the scale includes six $2\pi$ periodic signals and the third track signal includes three $2\pi$ periodic signals. These conditions are shown in (a) and (b) of FIG. 5.

Figure 5:
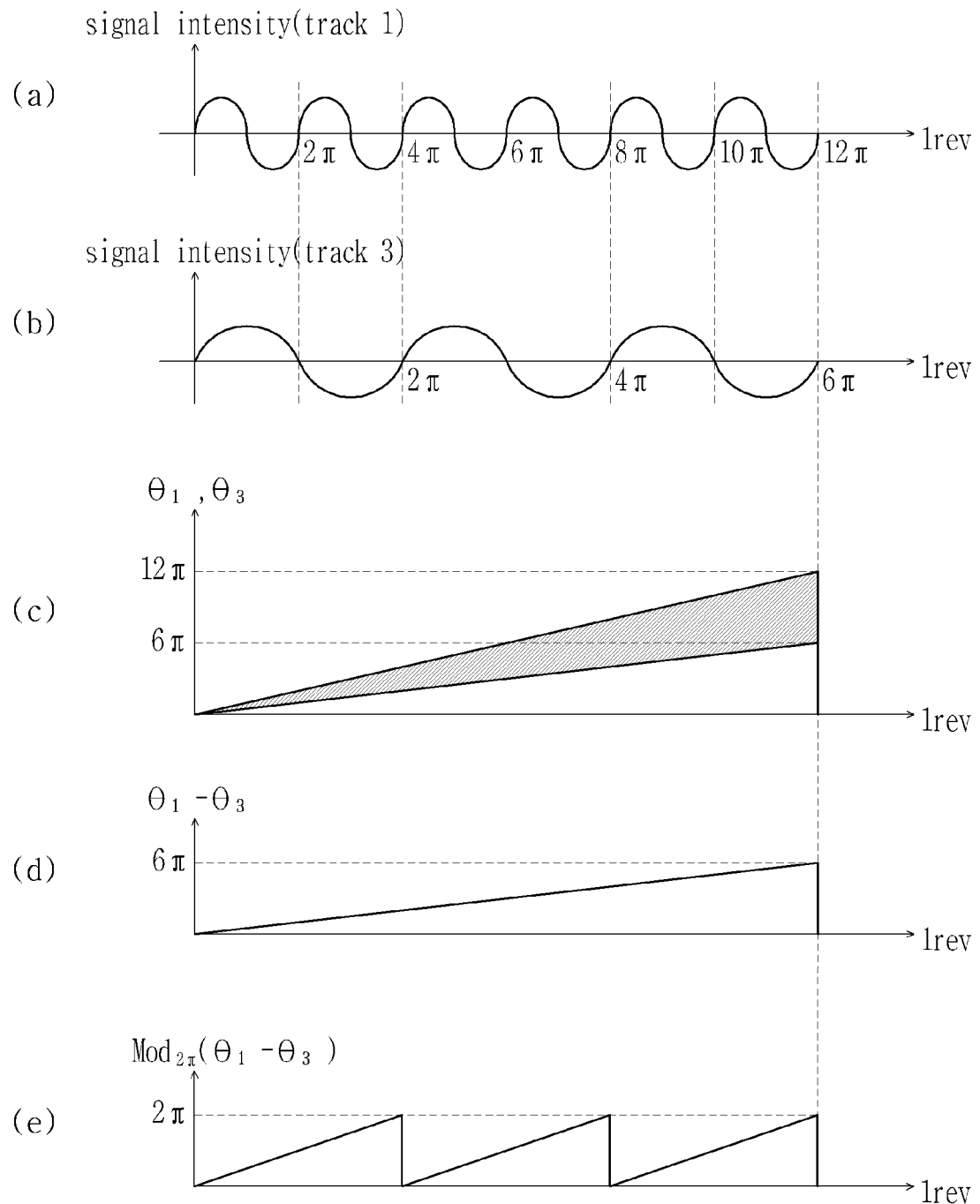
FIG. 5 is a schematic diagram showing a method of obtaining a second operation signal from the first track signal and a third track signal.

FIG. 5 is a schematic diagram showing a method of obtaining the second operation signal from the first track signal and a third track signal.

(a) and (b) of FIG. 5 represent a sine wave included in the first track signal and a sine wave included in the third track, respectively; and a cosine wave is also included in the signals of the respect tracks. When the sine wave and the cosine wave are used, as shown in (c) of FIG. 5, the angle $\theta_1$ limited to $12\pi$ with respect to the first track signal, and the angle $\theta_3$ limited to $6\pi$ with respect to the third track signal may be calculated.

A result of subtracting the angle $\theta_3$ from the angle $\theta_1$ is limited to $6\pi$ as shown in (d) of FIG. 5 and is represented as a signal in which one rotation of the scale is one period. When this signal is converted into a signal limited to $2\pi$ as shown in (b) of FIG. 4, the second operation signal composed of n periodic signals (where, n=3) per one rotation of the scale is generated. Expressing the second operation signal in a different way, the second operation signal may be represented as $\text{Mod}_{2\pi} (\theta_1-\theta_3)$.

Figure 6:
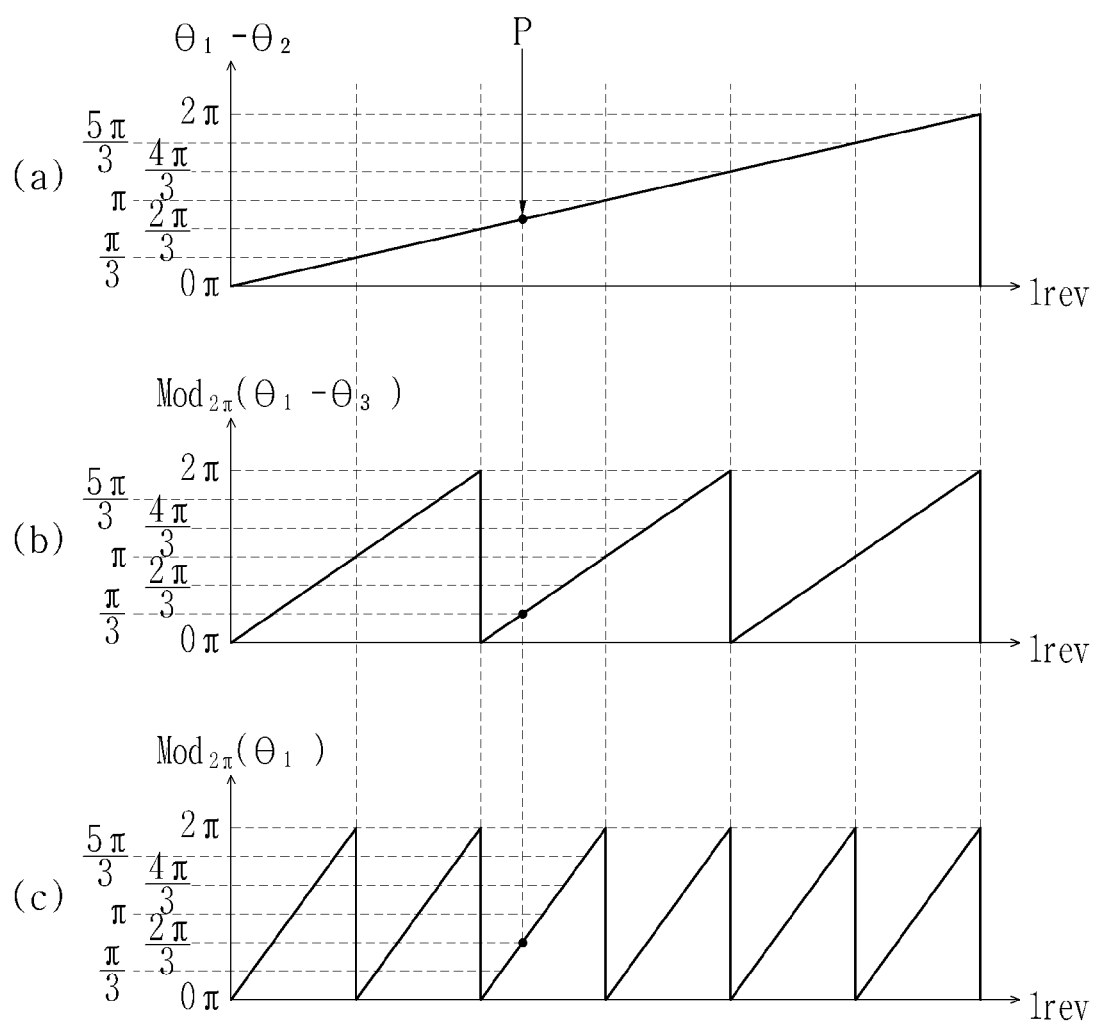
FIG. 6 is a schematic diagram showing the first track signal, a first operation signal and a second operation signal.

By going through the process above, waveforms as shown in (a) to (c) of FIG. 6 may be obtained. As mentioned above, when (a) of FIG. 6 is used, the absolute angle may be calculated in a theoretically infinite resolution, but real resolution is limited by the resolution of an A/D converter. For example, the A/D converter may have resolution which divides (a) of FIG. 6 into six sections.

When it is assumed that a real absolute angle of the scale is 140°, an angle outputted by the resolution of the A/D converter becomes $2\pi/3=120°$. That is, there is a measurement error of 20°.

In order to reduce this measurement error, the resolution should be increased, and the resolution may be increased in various ways using the A/D converter having limited resolution.

The arithmetic unit may select one among m periodic signals constituting the first track signal by analyzing the first operation signal in a first resolution. By analyzing the one periodic signal selected from among the m periodic signals in a third resolution, an absolute angle may be calculated.

In FIG. 6, (c) results from processing the first track signal with $\text{Mod}_{2\pi}$. (c) includes six periodic signals, and one periodic signal of these signals may be selected by analyzing the first operation signal. When an real absolute angle of the scale is 140°, a third periodic signal among the six periodic signals constituting (c) is selected. With regard to the respective periodic signals constituting (c), since a vertical axis is $2\pi$ which is identical to that of (a) of FIG. 6, when the A/D converter used upon analyzing the signal of (a) is used as it is, the selected third periodic signal may be divided into six sections. In this case, the first resolution and the third resolution are identical to each other.

The selected third periodic signal is based on the first track signal obtained through the first track and corresponds to a so-called experimental value. When a value of $2\pi/3$ is obtained by applying an A/D converter to the selected third periodic signal, the respective periodic signals are converted into the unit of an angle shown per one rotation of the scale using a proportional expression and the like. The value of $2\pi/3$ becomes $\pi/9$ resulting from converting it into an angle per one rotation of the scale.

The addition of $\pi/9$ obtained through the third periodic signal selected in $2\pi/3$ obtained through the first operation signal results in $7\pi/9$, and this value is outputted as the absolute angle of the scale. Through the process described above, one resolution of the scale may be divided into 36 sections using the A/D converter which may divide the signal into 6 sections.

When the second operation signal instead of the first track signal is used, one rotation of the scale may be divided into 18 sections using the A/D converter which may divide the signal into 6 sections.

Meanwhile, in the way to improve resolution of the scale using the first operation signal and the first track signal, robustness against noise may be provided using the second operation signal.

When an absolute angle is calculated by immediately using the first operation signal and the first track signal, an error may be generated due to an error of the first track signal itself or an error of the A/D converter. For example, despite the fact that the third periodic signal corresponding to the position of P shown in FIG. 6 should be selected from the six periodic signals constituting the first track signal, a second periodic signal or a fourth periodic signal may be selected due to the error. This error acts as a very fatal defect, and accordingly, there is a need to exclude this error to ensure reliability.

To do so, the second operation signal may be used. The number of periodic signals constituting the second operation signal is larger than that of periodic signals constituting the first operation signal and is smaller than that of periodic signals constituting the first track signal. For example, in FIG. 6, when the first operation signal is composed of one periodic signal and the first track signal is composed of six periodic signals, the second operation signal may be composed of three periodic signals.

In this condition, the arithmetic unit may select one among n periodic signals constituting the second operation signal by analyzing the first operation signal in the first resolution. After this, by analyzing the one periodic signal selected from among the n periodic signals in the second resolution, one among m periodic signals constituting the first track signal may be selected. Then, by analyzing the one periodic signal selected from among the m periodic signals in the third resolution, an absolute angle may be calculated. When the first resolution to the third resolution are all identical to each other, by, for example, dividing the first operation signal into six sections and analyzing it, it may be checked if a measurement point is matched with any periodic signal in the $n^{th}$ time in the second operation signal including three periodic signals. By dividing the checked periodic signal of the second operation signal into six sections and analyzing it, it may be checked if a measurement point is matched with any periodic signal in the $n^{th}$ time in the first operation signal including six periodic signals. This is if a resolution dividing one rotation of the scale into six sections is improved to a resolution capable of dividing one rotation of the scale into eighteen sections, and the resolution dividing one rotation of the scale into eighteen sections is again improved to resolution capable of dividing one rotation of the scale into thirty six sections. Also, as the resolution of each stage is provided with a margin, robustness against noise can be secured.

The absolute angle of the scale as reviewed above is closely related with tracks formed in the scale and the number patterns included in the respective tracks.

Specifically, when the scale includes the first track, the second track, and the third track, the number of patterns of the first track may be Ns*Nd (where, Ns is an integer of 1 or greater, and Nd is an integer of 2 or greater), the number of patterns of the second track may be Ns*Nd−1, and the number of patterns of the third track may be (Ns−1)Nd. Based on the description, Ns*Nd=m=6, Ns=2, and Nd=n=3 may be satisfied.

According to the first embodiment described above, in order to obtain the first operation signal, the first track signal and the second track signal are used, and in order to obtain the second operation signal, the first track signal and the third track signal are used. Accordingly, it is preferable that the first track to the third track be all provided.

For miniaturization of the scale and the improvement of productivity, it is advantageous to reduce the number of tracks. A way to reduce the number of tracks is disclosed through a second embodiment. According to the second embodiment, a resolution which is equal to that of the first embodiment may be obtained by only two tracks. Also, an absolute angle may be calculated in real time.

An optical encoder according to the second embodiment includes a light receiving unit, a scale and an arithmetic unit, wherein the scale is provided with a first track having m patterns and a second track having s patterns. At this time, a difference in number between the m and s may be Nd (where, 1<Nd<m). That is, a difference between the number of patterns of the first track and the number of patterns of the second track is two or greater.

The arithmetic unit may generate a first intermediate signal by performing an arithmetic operation for a first track signal composed of m periodic signals and a second track signal composed s periodic signals each outputted from the light receiving unit by the first track and the second track and may calculate an absolute angle on the basis of the first intermediate signal.

Specifically, the arithmetic unit may generate the first intermediate signal composed of Nd periodic signals per one rotation of the scale from a result of subtracting the second track signal from the first track signal.

Figure 7:
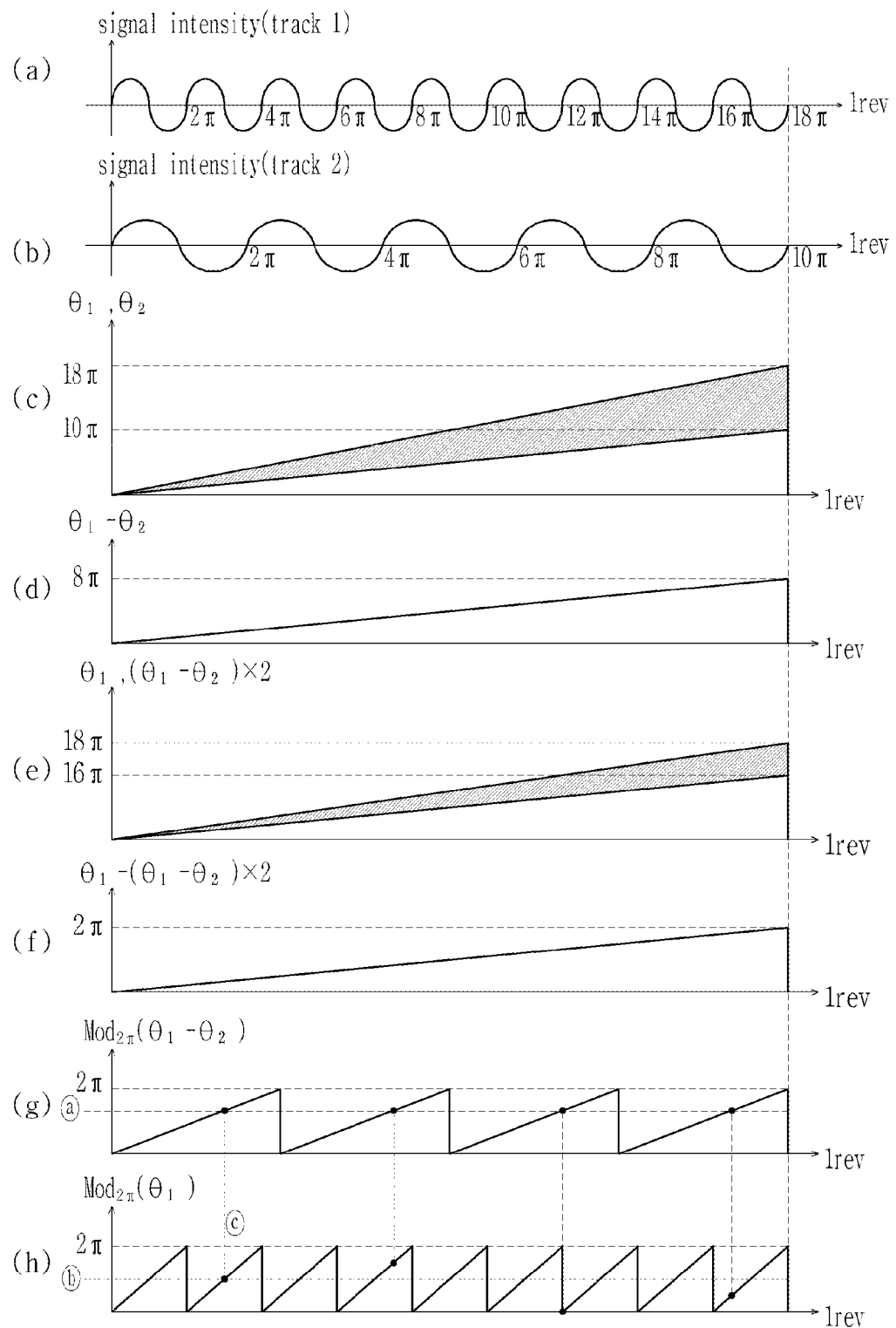
FIG. 7 is a schematic diagram showing signals generated from an optical encoder according to another embodiment of the present invention.

FIG. 7 is a schematic diagram showing signals generated from an optical encoder according to another embodiment of the present invention.

FIG. 7 discloses a case in which the first track has nine patterns and the second track has five patterns. In this case, Nd=4 may be satisfied.

According to the number of patterns formed in the respective tracks, the first track signal per one rotation of the scale has a waveform in which nine signals of a $2\pi$ period are included, and the second track signal has a waveform in which five signals of the $2\pi$ period are included.

When performing $MOD_{2\pi}$ operation processing with respect to the result of subtraction of $\theta_1$ and $\theta_2$ calculated from the respective waveforms according to the way mentioned based on FIG. 5, as shown in (g) of FIG. 7, Nd=4 periodic waveforms, the number of which is a difference between the number of patterns of the first track and the number of patterns of the second track, is obtained. The obtained waveform of (g) of FIG. 7 is the first intermediate signal. The first intermediate signal is similar to the second operation signal previously explained.

In summary, the arithmetic unit may generate the first intermediate signal composed of Nd periodic signals per one rotation of the scale from the result of subtracting the second track signal from the first track signal.

Like the case of the first operation signal illustrated in (b) of FIG. 4, when one periodic signal per one rotation of the scale is obtained, an absolute angle may be calculated. In the former embodiment, in order to obtain the first operation signal, the tracks in which a difference in the number of patterns is one have been used. In the present embodiment, the arithmetic unit may generate a second intermediate signal composed of one periodic signal per one rotation of the scale like the first operation signal by performing arithmetic operations for the first intermediate signal and the first track signal and may calculate an absolute angle by analyzing the second intermediate signal in set resolution.

At this time, the second intermediate signal may result from applying predetermined operation processing to the first intermediate signal, and thereafter, subtracting it from the first track signal. Specifically, the arithmetic unit may generate the second intermediate signal composed of one periodic signal per one rotation of the scale as shown in (f) of FIG. 7 from the result of multiplying the first intermediate signal by Ns (where, 0<Ns<m), and subtracting the multiplied signal from the first track signal. In the example of FIG. 7, Ns represents 2.

As such, when the first intermediate signal and the second intermediate signal are obtained, the arithmetic unit may calculate an absolute angle by analyzing the second intermediate signal to select one among Nd periodic signals constituting the first intermediate signal and analyzing the one periodic signal selected from among the Nd-periodic signals. This process is similar to the process in FIG. 6 for calculating an absolute angle by finally applying the A/D converter to the graph of (b) of FIG. 6. For example, when it is assumed that an A/D converter has resolution capable of dividing 360° into nine sections, the resolution is 9*4=36 because the A/D converter is applied to one periodic signal selected in the first intermediate signal. That is, one rotation of the scale may be divided into 36 sections by using the A/D converter.

Furthermore, the arithmetic unit may calculate an absolute angle by analyzing the one periodic signal selected among the Nd periodic signals to select one among m periodic signals constituting the first track signal expressed as shown in (h) of FIG. 7, and analyzing the one periodic signal selected from among the m periodic signals. This process is similar to the process in FIG. 6 for calculating the absolute angle by finally applying the A/D converter to the graph of (c) of FIG. 6. At this time, the resolution is 9*9=81. That is, one rotation of the scale may be divided into 81 sections by using the A/D converter.

Meanwhile, according to circumstances, it may be preferable that the second intermediate signal be not used. Since Ns is multiplied during the process for generating the second intermediate signal, noise is also multiplied to the extent of Ns, and the noise is reflected to the second intermediate signal. Accordingly, a way to obtain an absolute angle using only the first intermediate signal and the first track signal without generating the second intermediate signal may be considered.

As one example, the arithmetic unit may check Nd first intermediate points ⓐ by matching the result of subtraction of an angle calculated from the first track signal and an angle calculated from the second track signal outputted at a measurement position of the scale with the first intermediate signal. Since the first intermediate signal includes Nd periodic signals, the number of the matched first intermediate points ⓐ is Nd.

By matching the first intermediate points with m periodic signals constituting the first track signal, Nd second intermediate points ⓑ may be checked.

After this, the arithmetic unit may calculate an absolute angle by analyzing one among the m periodic signals including the second intermediate point being closest to a value of the first track signal outputted at the measurement position of the scale among the second intermediate points. Reviewing (h) of FIG. 7, it can be seen that the second intermediate points have all different values on a vertical axis. Based on these different values, a value of the first track signal outputted from a measurement position of the scale, for example, a periodic signal including the second intermediate point being closest to ⓒ among the Nd second intermediate points in comparison with ⓒ is checked in the m periodic signals. By analyzing the checked periodic signal in set resolution, so-called the resolution of an A/D converter, an absolute angle may be obtained.

In order to calculate the absolute angle using the first intermediate points and the second intermediate points, the number of patterns of the first track may be Ns*Nd+i (where, Ns and i are an integer of 1 or greater, and Nd is an integer of 2 or greater), and the number of patterns of the second track may be (Ns−1)*Nd+i.

In the example of FIG. 7, Ns is 2, and Nd=4, i=1. According to such a configuration of the tracks, the arithmetic unit may calculate an absolute angle of the scale based on the first track signal outputted from the light receiving unit facing the first track and the second track signal outputted from the light receiving unit facing the second track.

The respective embodiments described above are summarized as follows.

In order to obtain an absolute angle in real time while excluding a reference point, the arithmetic unit may generate one periodic signal per one rotation of the scale by performing arithmetic operations for the first track signal outputted from the light receiving unit by the first track and the second track signal outputted from the light receiving unit by the second track and may calculate the absolute angle based on the generated one periodic signal.

Specifically, the arithmetic unit calculates a first angle by performing an arithmetic operation for a signal value outputted from the light receiving unit through the first track. At this time, the first angle is an angle in which periodic signals constituting the first track signal are shown. Since the number of periodic signals constituting the first track signal is as many as the number of patterns of the first track, based on only the first angle, it cannot be confirmed if the angle is any angle of periodic signals corresponding to any patterns. Accordingly, the absolute angle may not be calculated based on only the first angle.

The arithmetic unit may calculate a second angle by performing an arithmetic operation for a signal value outputted from the light receiving unit through the second track. At this time, the second angle is also an angle in which periodic signals constituting the second track are shown. Since the number of the periodic signals constituting the second track signal is as many as the number of the second tracks, based on only the second angle, it cannot be confirmed if the angle is one of periodic signals corresponding to any patterns. Accordingly, the absolute angle may not be calculated based on only the second angle.

When a difference between the number of patterns of the first track and the number of patterns of the second tracks is one, a primary absolute angle is calculated by subtracting the second angle from the first angle. This is because the value resulting from the subtraction of the first angle and the second angle is a characteristic value per one rotation of the scale. At this time, the primary absolute angle is consistent with the angle shown in (b) of FIG. 4. In FIG. 4, since the first angle shows a limit of $12\pi$, and the second angle shows a limit of $10\pi$, an angle resulting from simply subtracting the second angle from the first angle becomes the primary absolute angle. Since a limit of each of the first angle and the second angle calculated through the arithmetic unit is $2\pi$, when performing $\mod_{2\pi}$ operation with respect to the result of subtracting the second angle from the first angle, the same result as that of (b) of FIG. 4 is outputted.

For reference, based on the primary absolute angle, it may be checked if a signal is outputted from any second pattern in the $n^{th}$ time among the second patterns constituting the first track. By analyzing the second pattern section checked as above, resolution may be improved. For example, in the case of the first track having 360 second patterns, when it is confirmed that a signal is outputted from a $180^{th}$ second pattern by using the primary absolute angle, the scale may be first checked to be positioned at the section of 180°~181°.

When analyzing the first track signal outputted from the 180$^{th}$ second pattern, a secondary absolute angle may be calculated. In other words, it may be confirmed if the scale is positioned at any point in the section of 180°~181°. At this time, when an A/D converter having a resolution of 360 is applied at the section of 180°~181°, a total of resolution of the optical encoder becomes 360*360.

When a difference between the number of patterns of the first track and the number of patterns of the second track is two or greater, integer multiples with respect to a result of subtracting the second angle from the first angle is performed. At this time, the integer multiple enables a result of the integer multiple and the result of subtraction of the first angle to be an absolute value, 1. This example is disclosed in FIG. 8.

FIG. 8 is a schematic diagram showing signals generated from an optical encoder according to a further embodiment of the present invention.

When the number of patterns of the first track is 2*3+2=8 (where, Ns=2, Nd=3, i=2) (see (a) of FIG. 8), the number of patterns of the second track is (2−1)*3+2=5 (see (b) of FIG. 8). The difference in the numbers is three, and by reflecting this condition, the first intermediate signal including three periodic signals per one rotation of the scale as shown in (c) of FIG. 8 is generated. At this time, when subtracting a result (9 periodic signals per one rotation of the scale being included) of performing three integer multiples with respect to the first intermediate signal from the first track signal, a value satisfying the absolute value 1 is outputted. This means that the second intermediate signal including one periodic signal per one rotation of the scale is generated. In FIG. 8, (d) and (e) disclose these conditions.

Through the arithmetic operation process, the primary absolute angle as above may be derived. In other words, a value obtained by performing integer multiples with respect to a result of subtracting the second angle from the first angle and subtracting the result of the integer multiples from the first angle has a characteristic value per one rotation of the scale.

In order to exclude the amplification of noise due to the integer multiples, the first intermediate points and the second intermediate points may be used.

A method of calculating the absolute angle of the scale according to the first embodiment and the second embodiment may be called a vernier method.

According to such a method, an optical encoder may include: a light receiving unit; a scale moving relatively to the light receiving unit and provided with a first track and a second track each having patterns intended for projecting light onto the light receiving unit; an arithmetic unit configured to calculate an absolute angle of the scale in a vernier method based on a difference between the number of the patterns of the first track and the number of the patterns of the second track; and a converter configured to A/D convert inputted signals into discrete values. At this time, the largest resolution of the absolute angle calculated from the arithmetic unit may be larger than that of the converter. Specifically, the arithmetic unit may calculate the absolute angle of the scale using the first intermediate signal in which periodic signals in a number resulting from subtracting the number of the patterns of the second track from the number of the patterns of the first track are repeated per one rotation of the scale.

For example, in FIG. 6, when resolution at the time of applying the A/D converter directly to (a) is 1, the resolution is increased up to three times during the progress of from (a) to (b), and is increased up to six times during the progress to (c).

Although the embodiments of the present invention have been disclosed for illustrative purposes, those skilled in the art will appreciate that various modifications and equivalent other embodiments are possible. Consequently, the true technical protective scope of the present invention must be determined based on the appended claims.

The invention claimed is:

1. An optical encoder, comprising:
   a light receiving unit;
   a scale comprising a first track having m patterns and a second track having s patterns, wherein a difference in number between the m and the s is Nd (where 1<Nd<m); and
   an arithmetic unit configured to generate a first intermediate signal by performing an arithmetic operation for a first track signal comprising m periodic signals and a second track signal comprising s periodic signals outputted from the light receiving unit by the first track and the second track, to calculate an absolute angle based on the first intermediate signal, to generate a second intermediate signal comprising one periodic signal per one rotation of the scale, and to calculate the absolute angle by analyzing the second intermediate signal in set resolution,
   wherein the second intermediate signal results from subtracting a result of an arithmetic operation for the first intermediate signal from the first track signal.

2. The optical encoder of claim 1, wherein the arithmetic unit is further configured to generate the first intermediate signal comprising Nd periodic signals per one rotation of the scale from a result of subtracting the second track signal from the first track signal.

3. The optical encoder of claim 1, wherein the arithmetic unit is further configured to:
   generate a second intermediate signal comprising one periodic signal per one rotation of the scale from a result of multiplying the first intermediate signal by Ns (where 0<Ns<m) and subtracting the multiplied signal from the first track signal, and
   calculate the absolute angle by analyzing the second intermediate signal in set resolution.

4. The optical encoder of claim 1, wherein the arithmetic unit is further configured to:
   generate a second intermediate signal comprising one periodic signal per one rotation of the scale from a result of multiplying the first intermediate signal by Ns (where 0<Ns<m) and subtracting the multiplied signal from the first track signal,
   select one of Nd-periodic signals constituting the first intermediate signal by analyzing the second intermediate signal, and
   calculate the absolute angle by analyzing the one periodic signal selected from among the Nd periodic signals.

5. The optical encoder of claim 1, wherein the arithmetic unit is further configured to:
   generate a second intermediate signal comprising one periodic signal per one rotation of the scale from a result of multiplying the first intermediate signal by Ns (where 0<Ns<m) and subtracting the multiplied signal from the first track signal,
   select one among Nd periodic signals constituting the first intermediate signal by analyzing the second intermediate signal, select one among m periodic signals constituting the first track signal by analyzing the one periodic signal selected from the Nd-periodic signals, and calculate the absolute angle by analyzing the one periodic signal selected from the m-periodic signals.

6. The optical encoder of claim 1, wherein the arithmetic unit is further configured to:

check Nd first intermediate points by matching a result of subtracting an angle calculated from the first track signal outputted at a measurement position of the scale and an angle calculated from the second track signal with the first intermediate signal, check Nd second intermediate points by matching the first intermediate points with the m-periodic signals, and calculate the absolute angle by analyzing one of the m periodic signals comprising the second intermediate point being closest to a value of the first track signal outputted at the measurement position of the scale among the Nd second intermediate points.

7. The optical encoder of claim 1, wherein the arithmetic unit is further configured to generate one periodic signal per one rotation of the scale and to calculate the absolute angle of the scale based on the periodic signal.

8. The optical encoder of claim 7, wherein a difference between the number of patterns of the first track and the number of patterns of the second track is two or more.

9. An optical encoder, comprising:

a light receiving unit;

a scale comprising a first track having m patterns and a second track having s patterns, wherein a difference in number between the m and the s is Nd (where 1<Nd<m);

an arithmetic unit configured to generate a first intermediate signal by performing an arithmetic operation for a first track signal comprising m periodic signals and a second track signal comprising s periodic signals outputted from the light receiving unit by the first track and the second track, to calculate an absolute angle based on the first intermediate signal, and to calculate the absolute angle of the scale in a vernier method based on the difference between the number of the patterns of the first track and the number of the patterns of the second track; and a converter configured to A/D convert inputted signals into discrete values, wherein a largest resolution of the absolute angle calculated from the arithmetic unit is larger than that of the converter.

10. The optical encoder of claim 9, wherein the arithmetic unit is further configured to calculate an absolute angle of the scale using a first intermediate signal in which periodic signals in the number resulting from subtracting the number of patterns of the second track from the number of patterns of the first track are repeated per one rotation of the scale.

* * * * *